Oct. 15, 1968 R. A. CURRAN 3,406,368

INTERCONNECTION SYSTEM

Filed May 16, 1966

INVENTOR.
Robert A. Curran

BY

Robert E. Corb
ATTORNEY

United States Patent Office 3,406,368
Patented Oct. 15, 1968

3,406,368
INTERCONNECTION SYSTEM

Robert A. Curran, Framingham, Mass., assignor, by mesne assignments, to Solitron Devices, Incorporated, Tappan, N.Y., a corporation of New York Filed May 16, 1966, Ser. No. 550,324
10 Claims. (Cl. 339—17)

ABSTRACT OF THE DISCLOSURE

An "in line" interconnection system for interconnecting discrete integrated circuit formations mounted on modular supporting structures connecting uniquely formed and arranged conductor terminals on the modules to a motherboard. There is further provided a module connector for making a low resistance connection with conductor terminals on a module to enable the integrated circuit modules to be stacked "in line" at low cost and in a highly compact manner.

This invention relates to an electrical interconnection system, and more particularly to a system for interconnecting discrete integrated circuit formations mounted on modular supporting structures.

It is well known that in spite of significant reductions in the size and cost of integrated circuits, per circuit function, proportionally significant reductions in the cost and volume of the assemblies of modular supporting structures for the integrated circuits have not been obtainable. A large part of the cost of digital computers and other integrated circuit assemblies is attributable to the structures and processes for interconnecting the IC's, that is, to the packaging of the IC's.

Some of the overall packaging inefficiencies are generated at the (Level I) connections between the IC formations or monolithic circuit modules and the printed circuit cards or modules interconnecting the formations. Contributing to these inefficiencies are the limitations imposed by thermal management, mechanical rigidity, shock and vibration resistance, and so forth.

However, perhaps even greater inefficiencies have resulted at the (Level II) interconnections between the modules or cards themselves. The reliability (related to the mean time between failures) of an assembly of IC's increases directly with the number of IC's per module. However, as the number of IC's per module increases, the uniqueness, and hence the replacement and maintenance costs also increase. Therefore, a balance must be drawn in system design between reliability and maintainability. One significant factor entering into maintainability is the ease and speed, translatable into cost, with which a defective circuit function or functions can be replaced.

Interconnection structures have evolved for electrically joining points on discrete modules having the same operating potentials. As related to modules of the type "in line," the interconnecting structures have generally included a common interconnection plane, commonly called a "motherboard," and a connector for connecting the input and output terminals on the module to the motherboard. Recognizing the reliability and cost inducements of maintaining the number of IC's per module as high as possible, and because all conductor terminals on modules of the "in line" type are generally made adjacent an edge of the module, it follows that such connectors, in addition to rendering the interconnected module readily interchangeable, must provide a relatively high interconnection density.

Previously, many connectors have included a contact lined socket for receiving a marginal portion along an edge of a card or module lined with spaced conductor terminals. Such connectors, because they comprise essentially a socket, necessarily impose a limitation on the minimum module spacing achievable, and hence a corresponding limitation on the volumetric efficiency of the overall assembly package.

It is desirable that IC module connectors be sufficiently durable to withstand a large number of mating and unmating cycles without appreciable contact wear or damage; the construction and operation of the connectors should be designed to insure satisfactory connections and to resist inadvertent damage during assembly and disassembly operations.

Accordingly, it is an object of this invention to provide a novel interconnection system for interconnecting integrated circuit formations mounted on modular supporting structures which facilitates rapid and easy interchange and replacement of discrete modules and yet which is more compact and less expensive than previously existing systems.

It is another object of this invention to provide an "in line" interconnection system for IC modules including novel electrical connectors for electrically connecting uniquely formed and arranged conductor terminals on the modules to a motherboard.

It is a further object of this invention to provide an interconnection system for IC modules including a module connector which includes means for making a low resistance connection with conductor terminals on a module, and which enables IC modules to be stacked "in line" at low cost and in a highly compact manner.

It is still another object of this invention to provide a socketless IC module connector including a novel arrangement of contacts capable of making a low friction, biased engagement with conductor terminals on a module and which are durable and not susceptible to damage by excessive pressures during conductor-to-module mating operations.

Other objects of this invention will in part be obvious and will in part appear hereinafter.

The invention accordingly comprises the apparatus possessing the construction, combination of elements, and arrangement of parts which are exemplified in the following detailed disclosure and the scope of the application of which will be indicated in the claims.

For a fuller understanding of the nature and objects of the invention, reference should be had to the following detailed description taken in connection with the accompanying drawing wherein.

Figures 1, 2:
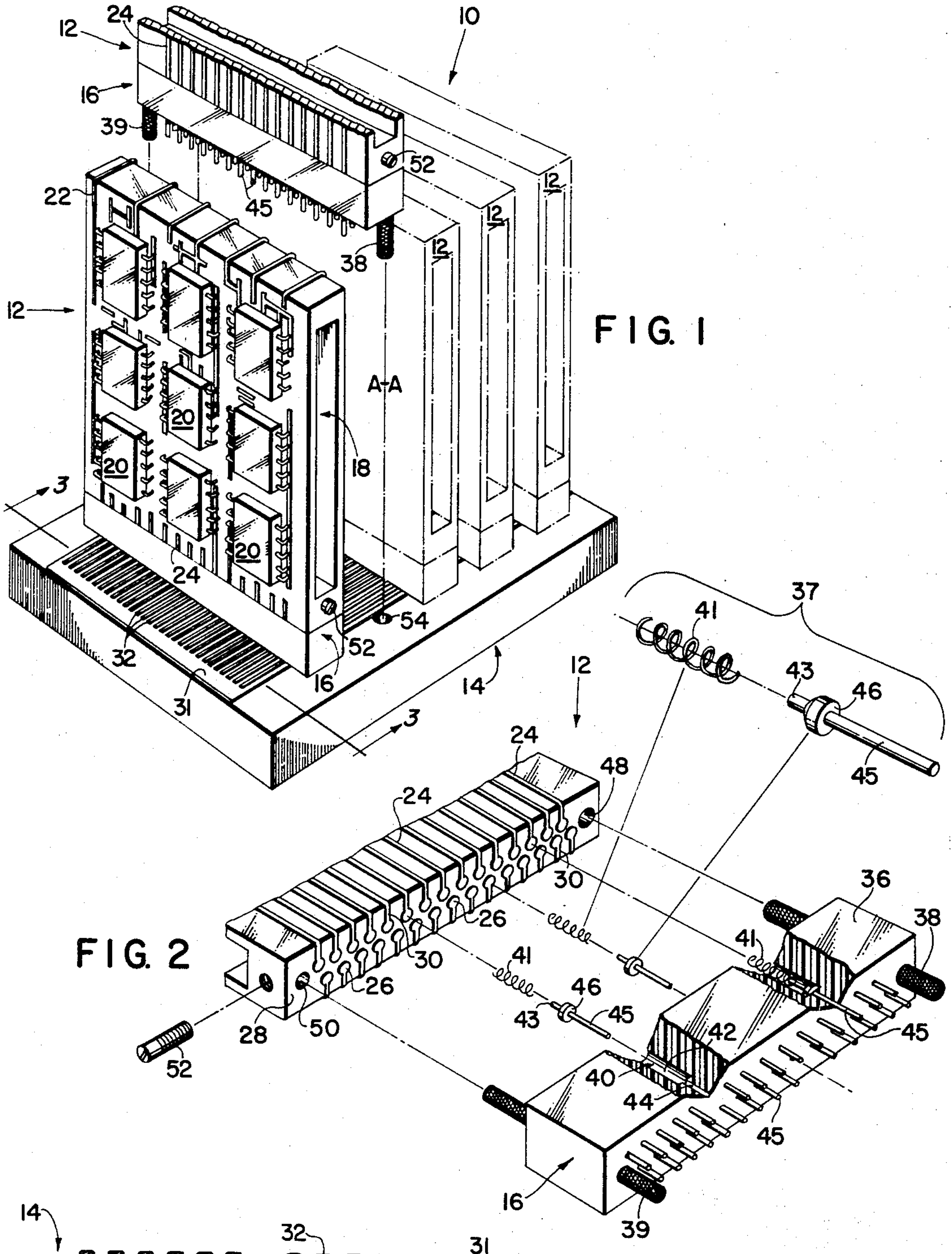
FIGURE 1 is a perspective view of an assembly of IC modules electrically joined through an interconnection system constructed and arranged in accordance with the invention, one IC module being shown as exploded from a motherboard constituting a part of the interconnection system.
FIG. 2 is an exploded view of an IC module and an operatively associated connector constituting part of a novel interconnection system.

Many and diverse applications of the invention are contemplated. One structural implementation of the invention is illustrated in the drawing as being incorporated into an assembly 10 of modules 12 for supporting circuit elements. See especially FIGURE 1.

The assembly 10 would ordinarily constitute a subassembly in a much larger assembly of modules, such as are commonly found, for example, in computers. These cards or modules 12 are interconnected through a novel interconnection system including an interconnection plane or motherboard 14 and connectors 16 for connecting the modules 12 to the motherboard.

Although various types of panels, cards or modules for supporting and interconnecting electrical elements and circuits, including monolithic circuit modules, may be interconnected in accordance with the invention, the novel interconnection system being particularly useful when adapted to interconnect integrated circuit (IC) modules 12 constructed as illustrated in the drawing. A complete description of the structure, properties, advantageous characteristics, and method of manufacture of such IC modules is contained in the application of Robert A. Curran Ser. No. 196,319, filed May 21, 1962. Briefly, such modules 12 comprise a metal substrate for mechanical rigidity, high heat dissipation, and utility as a ground plane. Superposed, insulated, interconnected layers of conductive patterns are formed on non-conductive layers supported on the metal substrate.

Referring especially to FIGURE 1, the illustrated modules 12 are shown as comprising generally parallelepiped-shaped, shell-like structures having a central opening 18 for dissipating heat generated in IC formations 20 operatively mounted upon at least one surface of each of the exemplary modules 12. Whereas IC formations 20 packaged in a "flat pack" format have been illustrated, it is to be understood that IC formations of all types and various other circuit elements may be interconnected according to the present invention.

The outermost pattern of conductors for interconnecting IC formations 20 may be seen on one of the modules 12 illustrated in FIGURE 1. Examples of individual conductors constituting the outermost pattern are designated 22 and 24. The conductive patterns on the modules 12 may, for example, be applied upon a surface of an insulating material separating the patterns by spraying conductive particles upon selected areas of the surface. Such a process is fully described in the above-identified application.

Referring especially to FIG. 2, in accordance with one aspect of the invention, conductor terminals 26 are formed in spaced relationship along an edge surface 28 of the modules 12. It has been found to be particularly advantageous to use a flame spray metallaying process for forming the conductive patterns on the modules 12, for the reason that the terminals 26, as well as conductors 24 and linking conductor portions 30, can be formed by a single, low-cost, spraying operation adaptable to mass production practices.

Relatively high circuit interconnection densities are obtainable by utilizing a spray technique for forming the conductors and terminals 26 on modules 12 because of the large number of terminals that can be formed on the limited area available on the edge surface 28 of the module 12. By way of example, IC modules have been constructed having conductor terminals 26 formed on .050 inch spaced centers.

Figure 3:
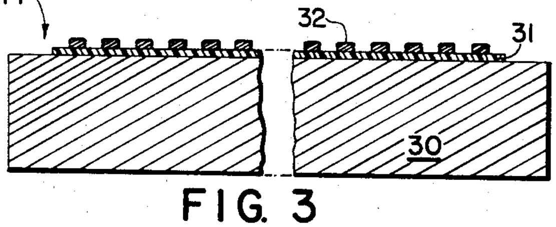
FIG. 3 is an enlarged sectional view taken along line 3—3 in FIG. 1.

In order that conductor terminals on discrete IC modules having the same operating potentials may be interconnected in a manner which is inexpensive and which renders the modules readily interchangeable, a novel motherboard 14 is provided. Referring especially to FIG. 3, the motherboard 14 may comprise an electrically conductive base 30 having a non-conductive layer 31 thereon supporting a plurality of electrically conductive strips 32 arranged in parallel, spaced relationship. The conductive strips 32 are preferably sprayed upon the layer 31 by the process used to apply the conductive patterns and terminals 26 to the modules 12, as described in the above-identified application. The interstitial areas of layer 31 between the strips 32 act as an effective insulator to electrically isolate the individual strips 32.

For the purpose of electrically joining terminals 26 on modules 12 to a predetermined one of the conductive strips 32 in a manner and with means satisfying the objects of the invention, a novel connector 16 is provided. Viewing FIG. 2 in particular, connectors 16 each comprise a non-conductive body 36 supporting contact means 37 and a pair of support posts 38 and 39, which may be of different diameter to dictate a one-way orientation of the connector 16.

Contact means 37 for electrically joining the conductor terminals 26 to conductive strips 32 on the motherboard 14 are carried in respective cavities or bores 40 extending through the body 36 of the connector 16. Each of the contact means 37 may comprise a first portion in the form of an electrically conductive spring 41 receivable in an enlarged-diameter section 42 of the bore 40 and a second portion in the form of a conductive pin 43 receivable in a reduced-diameter section 44 of bore 40. Pins 43 may have terminations 45 extending from connector 16 for engagement with conductive strips 32 on motherboard 14.

To retain the pins 43 in bores 40 in engagement with springs 41, each of the pins 43 may be provided with an integral flange 46.

Bores 40 and the contact means 37 received therein are respectively aligned in registration with an equal number of terminals 26 on the edge surfaces 28 in order that when the connectors 16 and the modules 12 are operatively connected, as by plugging corresponding ends of support posts 38 and 39 in sockets 48 and 50, the springs 41 will make a low-friction, biased engagement with respective terminals 26. The resiliency supplied by springs 41 insures that as the connectors 16 and the modules 12 are connected, and springs 41 are compressed thereby, the electrical resistance created at the point of contact between each of the springs 41 and the associated terminal 26 will be satisfactorily low.

It is evident also that because contact is made during a mating operation between springs 41 and the terminals 26 in a direction parallel to the axes A—A of interconnection between modules 12 and the connectors 16, very little, if any, friction is produced between the springs 41 and the respective conductor terminals 26. Such a mating action operates to provide a long useful life for the modules 12 and the connectors 16. Further, in such an arrangement, the contact means 37 need perform no supporting or gripping function and are not susceptible to damage by excessive pressures during mating or unmating operations; and since pins 43 need project only a relatively short distance from body 36, they are less subject to being damaged or bent. Moreover, slight bending of the pins may be tolerated whereas it could not be tolerated in a system in which the pins were to be inserted into sockets.

To prevent the restorative force in springs 41 from effecting a disconnection of the connectors 16 from the modules 12, the support posts 38 and 39 are preferably knurled and pressed into sockets 48 and 50. Alternative means for locking posts 38 and 39 within sockets 48 and 50, comprise simple set screws 52.

A module 12 and connector 16 may be coupled as a unit with a motherboard 14 by inserting posts 38 and 39 into sockets 54 in the base 30 of motherboard 14, the pin terminations 45 being biased by springs 41 into firm physical engagement with the conductive strips 32 on the non-conductive layer 31. The bias produced by springs 41 on pin terminations 45 provides a sound, low-resistance electrical union between the terminations 45 and the conductive strips 32.

By employing the metal substrate of modules 12 as a ground plane for the IC formations 20 and by forming the support posts 38, 39 from a material exhibiting high electrical conductivity, the IC formations 20 will be grounded to the base 30 of motherboard 14 and posts 38 and 39.

It is evident from the drawing and the preceding description of an exemplary interconnection system that the invention provides a system for interconnecting IC formations or other electrical circuit elements on modular supporting structures which is compact and low in cost, and which satisfies in all respects the other enumerated purposes and objects of the invention.

As heretofore stated, the interconnection system shown and described herein is illustrative only. Other modified systems and connecting structures are contemplated and are within the purview of the invention.

What is claimed is:

1. For use in a system for interconnecting a plurality of electrical elements, the combination comprising:
a support member mounting a plurality of circuit elements and a pattern of conductors interconnecting said elements, said conductors having terminals spaced along an edge surface of said support member; and
an electrical connector, comprising:
an electrically non-conductive body;
a plurality of contact means, each supported by said body and each having a first portion in position for engagement with a predetermined one of said terminals;
resilient means for producing a force acting on said first portion of each of said contact means in a direction substantially parallel to the axis of interconnection of said connector and said member, whereby upon connection of said member with said connector, said first portions of said contact means make low friction, biased engagement with said terminals; and
mounting means for securing said connector to said edge surface of said support member against the bias of said resilient means.

2. A combination as defined in claim 1 wherein said resilient means comprise respective electrically conductive springs which includes said first portions of said contact means.

3. A combination as defined in claim 2 wherein said secured portion of each of said contact means comprises a conductive pin in engagement with a respective one of said springs and slideably retained in a bore in said body with one end projecting from said body.

4. A combination as defined in claim 1 including interconnection means for electrically interconnecting on discrete connectors contact means having the same operating potentials when said connectors are operatively connected to respective element supports, said interconnection means including conductive strips supported on a surface of a support in a plane substantially perpendicular to said axis of interconnection.

5. For use in a system for interconnecting a plurality of integrated circuit formations, the combination comprising:
an integrated circuit module including a plurality of circuit formations mounted on at least one surface thereof and including a pattern of conductors for electrically interconnecting said formations, said conductors having input-output terminals spaced along an end edge of said module adjacent said surface; and an electrical connector, comprising:
an electrically non-conductive body;
a plurality of contact means, each supported by said body and each having a first portion in position for engagement with a predetermined one of said terminals;
resilient means for producing a force acting on said first portion of each of said contact means in a direction substantially parallel to the axis of interconnection of said connector and said module, whereby upon connection of said module with said connector, said first portions of said contact means make low friction, biased engagement with said terminals; and
mounting means for securing said connector to said module against the bias of said resilient means.

6. A system as defined in claim 5 including a motherboard for electrically interconnecting on discrete connectors contact means having the same operating potentials when said connectors are operatively connected to respective modules, said motherboard including conductive strips supported on a non-conductive substrate in a plane substantially perpendicular to said axis of interconnection for electrical engagement of said contact means at any point along the length of one of said conductive strips.

7. A system as defined by claim 6 wherein said resilient means comprise respective electrically conductive compression springs each supported in a bore in said body, each of said springs including said first portions of said contact means.

8. A system as defined in claim 7 wherein said secured portion of each of said contact means comprises a conductive pin in engagement with a respective one of said springs and slideably retained in said bore containing said respective spring with one end projecting from said body for resilient engagement at any point along the length of one of said conductive strips on said motherboard.

9. A system as defined in claim 8 wherein said mounting means comprise a pair of support posts extending through said body and engaged at appropriate ends in sockets in said motherboard and in said module.

10. A system as defined in claim 9 wherein said module includes a conductive metal substrate and wherein said support posts act as grounding conduits from said substrate to said motherboard.

References Cited

UNITED STATES PATENTS

| | | | |
|---|---|---|---|
| 2,792,557 | 5/1957 | Dowick | 339—14 |
| 3,158,419 | 11/1964 | Meyer et al. | 339—18 |
| 3,188,596 | 6/1965 | Turner | 339—14 |
| 3,300,686 | 1/1967 | Johnson et al. | 339—17 XR |
| 3,317,885 | 5/1967 | Yost | 339—17 XR |

MARVIN A. CHAMPION, *Primary Examiner.*

PATRICK A. CLIFFORD, *Assistant Examiner.*